Jan. 6, 1925.
C. H. PARSONS ET AL
1,522,385
PROCESS OF MAKING PASTEURIZED LOAF CHEESE
Filed July 11, 1923    2 Sheets-Sheet 1
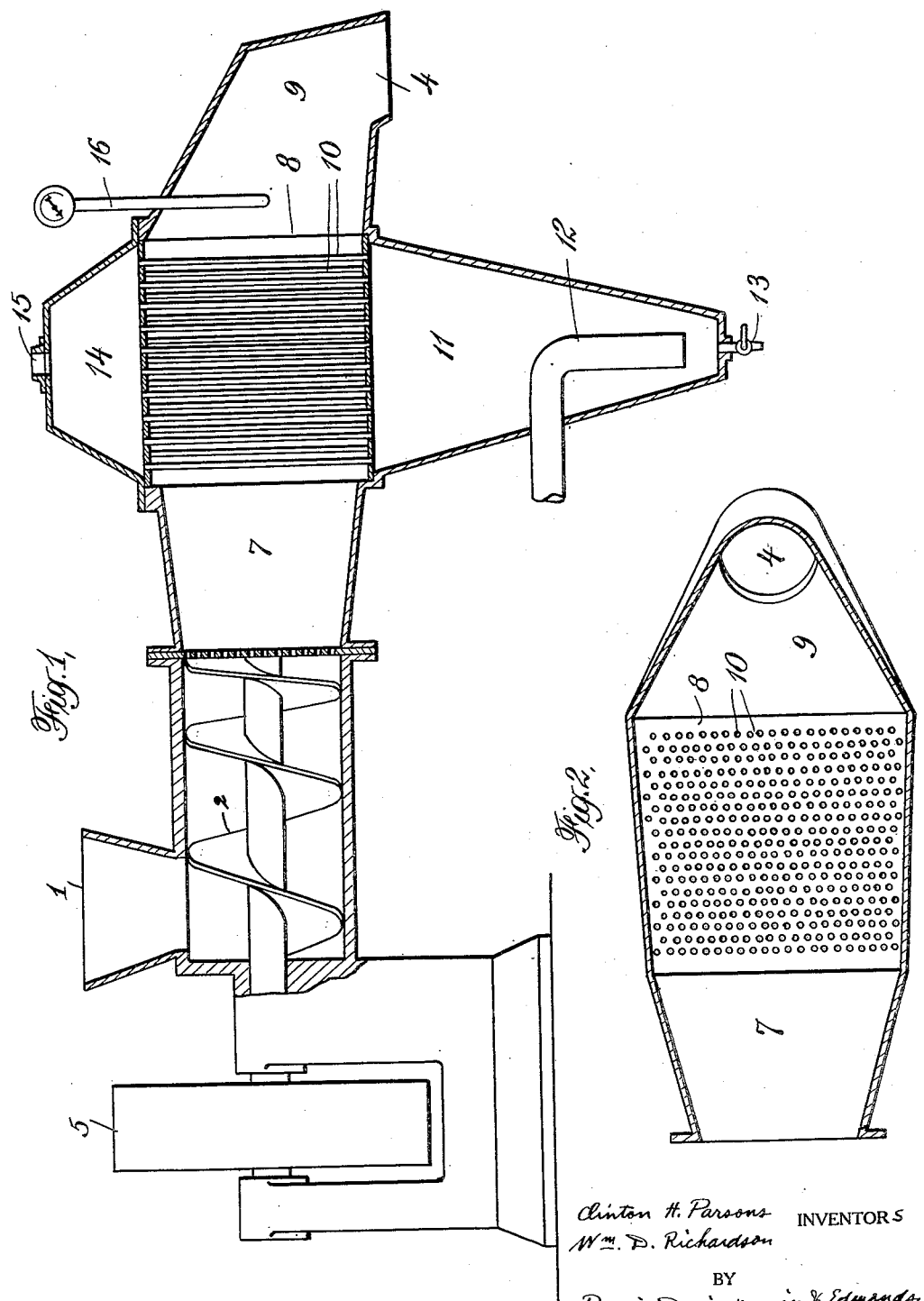
INVENTORS
Clinton H. Parsons
Wm. D. Richardson
BY
Pennie Davis Marvin & Edmonds
ATTORNEYS

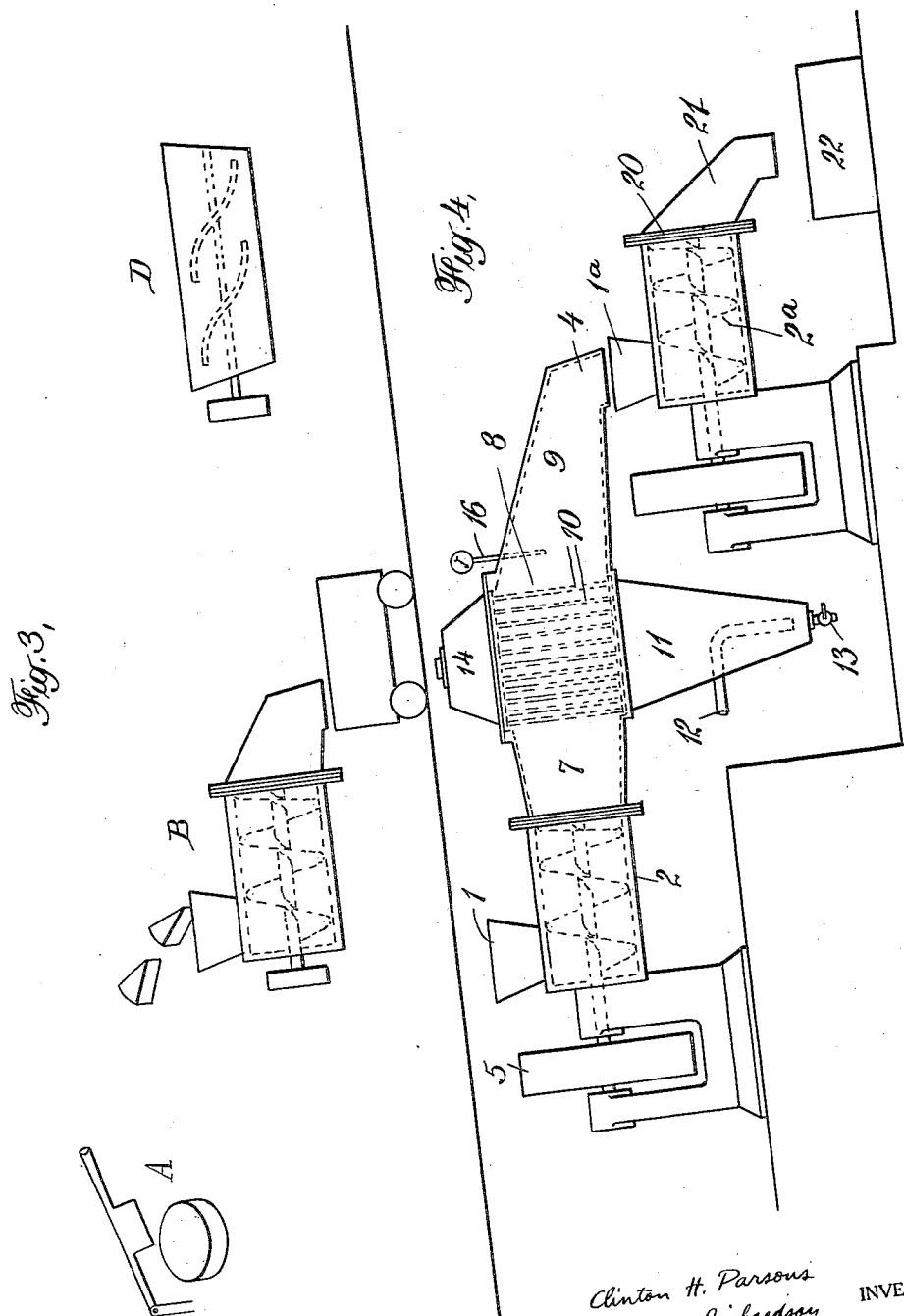

Patented Jan. 6, 1925.

1,522,385

UNITED STATES PATENT OFFICE.

CLINTON H. PARSONS AND WILLIAM D. RICHARDSON, OF CHICAGO, ILLINOIS, ASSIGNORS TO SWIFT & COMPANY, OF CHICAGO, ILLINOIS, A CORPORATION OF ILLINOIS.

PROCESS OF MAKING PASTEURIZED LOAF CHEESE.

Application filed July 11, 1923. Serial No. 650,975.

*To all whom it may concern:*

Be it known that we, CLINTON H. PARSONS and WILLIAM D. RICHARDSON, citizens of the United States, both residing at Chicago, county of Cook, State of Illinois, have invented certain new and useful Improvements in Processes of Making Pasteurized Loaf Cheese; and we do hereby declare the following to be a full, clear, and exact description of the invention, such as will enable others skilled in the art to which it appertains to make and use the same.

The present invention relates to an improved method for pasteurizing or sterilizing cheese in a continuous manner.

The invention has for its purpose the preparation of cheese, blended or unblended, of uniform and smooth texture, without or with additions such as pimento peppers, sage and other flavoring substances, etc., in pasteurized or sterilized condition, so that under ordinary storage it will keep without material change longer than the usual types of cheese. The cheese product can be molded in convenient packaged form so that it can be sliced without waste.

In its broader aspects, the process of the invention is an improved pasteurizing or sterilizing process in which the cheese, or cheese mixture, is subjected to a pasteurizing or sterilizing operation in a continuous manner. In carrying out the process the cheese is forced or propelled by a suitable forcing or propelling device through a pasteurizing apparatus in a continuous manner and is subjected in such pasteurizing apparatus to intimate contact with heating tubes or other heating elements and is thereby heated to the pasteurizing or sterilizing temperature.

This continuous pasteurizing or sterilizing process is advantageously combined with an emulsifying treatment for subjecting the cheese to emulsification in a continuous manner so that there is directly produced, as the product of the process, a cheese which is both emulsified and pasteurized or sterilized.

The emulsification of the cheese may advantageously precede the pasteurization, and the emulsifying and pasteurizing operations may advantageously be carried out in a combined emulsifying and sterilizing apparatus in which the emulsifier serves as a propelling or forcing device for forcing the emulsified cheese through the pasteurizer in a continuous manner. This combined operation is more fully described and is specifically claimed in our companion application Serial No. 650,974. The low temperature emulsification process is more particularly described and claimed in our companion application Serial No. 650,976. As pointed out in that application, the preliminary emulsification is advantageously carried out at a low temperature, and gives an emulsified cheese product having the important advantage that it can be melted without material butter-fat separation, so that it can be forced through the pasteurizing apparatus and heated therein to the pasteurizing or sterilizing temperature without appreciable butter-fat separation.

Instead of combining the new pasteurizing process with a preliminary emulsification of the cheese, it may advantageously be combined with a subsequent emulsification to give a final pasteurized (or sterilized) and emulsified product which can be melted, as in making Welsh rarebit, without butter-fat separation, or without such separation to a material degree. In the present application, the broader claims are directed to the broader aspects of the continuous pasteurization process, and the more specific claims are directed to the combined pasteurizing and subsequent emulsifying process; the combined preemulsification and pasteurizing process being claimed in said companion application Serial No. 650,974 as above noted.

The cheese which is treated according to the process of the present invention may be either blended or unblended cheese, with or without additions thereto. In carrying out the process we first take the cheese as received and proceed to grade it, if not already graded, according to the kind, age and flavor, or, if graded to regrade it. We then cut the cheese, each kind separately, into coarse blocks suitable for introduction into the grinding machines. The cheese is next ground through any suitable grinder or hasher, such, for example, as a hasher of the Enterprise type. The ground cheese is received in trucks or suitable receptacles and weighed quantities, together with any admixtures such as pimento peppers, salt, powdered milk and the like, are introduced into a suitable mixing machine in which the various ingredients are incorporated into an approximately homogeneous mass. The mixed cheese is then subjected to the pasteurizing, or combined pasteurizing and emulsifying, operations.

In carrying out the pasteurizing operation, the cheese is introduced into the propelling mechanism of the pasteurizer and is propelled or forced through the pasteurizer in a continuous manner and is heated therein to the pasteurizing or sterilizing temperature. The propelling device may advantageously consist of a machine provided with a helical screw and hopper, the cheese being introduced into the hopper and acted upon by the helical screw and forced into and through the pasteurizer. The propelling machine may serve merely to propel or force the cheese through the pasteurizer or it may, in addition, serve to emulsify the cheese before forcing it through the pasteurizer. When the propelling device also serves as an emulsifier, the emulsifying operation is advantageously carried out at a low temperature without the application of heat, or at most at a very moderate temperature, preferably between 95 and 105° F., as more fully described in our said companion application.

When the propelling machine is also to serve as a preliminary emulsifier for emulsifying the cheese before pasteurization, it should advantageously contain the necessary elements to control or provide (1) rapid agitation or whipping or kneading or grinding of the cheese or cheese mixture without the production of a temperature in excess of 110° F., (2) means for maintaining the cheese under sufficient pressure to promote active emulsification, and (3) means for propelling the cheese through the emulsifying and pasteurizing devices.

The propelling machine may be similar to the Enterprise hasher and may have a perforated plate or similar obstruction to increase the back pressure upon the cheese, where emulsification is desired. The cheese introduced into the hopper is acted upon by the helical screw and forced forward through the perforated plate and into and through the pasteurizer, and where low temperature emulsification is desired before pasteurization, the machine is operated at a fairly rapid rate, for example 500 to 600 R. P. M. for large machines, or 1000 to 1200 R. P. M. for small machines, these rates being e. g., four to six times the ordinary rate of rotation. This rate of rotation, acting in conjunction with the back pressure produced by the perforated plate and the pasteurizer, produces emulsification of the cheese at a low temperature, such that the emulsified cheese can be pasteurized and melted without material separation of butter-fat, as more fully described in our companion application.

Where the preliminary emulsification of the cheese is not effected, the propelling device will act merely to force the cheese in a continuous manner into and through the pasteurizer, although some additional mixing of the cheese may take place in the propelling device during its passage therethrough.

The pasteurizer through which the cheese is forced in a continuous manner may vary in its construction but it may advantageously consist of an apparatus having a pasteurizing chamber provided with heating surfaces placed rather closely together around which and between which the cheese is forced by the propelling mechanism. The heating surfaces may be arranged in different ways and may be heated by any suitable means; for example, the heating surfaces may be provided by tubes or by a honeycomb construction with hot water or other heating medium circulating therethrough, or parallel heated surfaces may be provided between which the cheese is forced, or electrically heated units of various designs and arrangements may be used. On coming in contact with the heated tubes or other heated surfaces the cheese is softened to a degree determined by the heat, the size and arrangement of the heating chamber and the time of passage therethrough. Being heated and softened it flows smoothly and without interruption between and past the tubes or other surfaces and so on to the outlet.

As discharged from the pasteurizer, the cheese is in condition to be packaged or boxed as pasteurized cheese; and, if the cheese has been emulsified before pasteurization, the pasteurized cheese product will also be an emulsified product. When the cheese is not subjected to emulsification before pasteurizing, or if a higher degree of emulsification is desired, it may advantageously be subjected to a subsequent emulsifying operation, by passing the pasteurized cheese through an emulsifying machine and thereby securing an emulsified as well as pasteurized product. The emulsifying machine may be an Enterprise hasher or similar device into the hopper of which the pasteurized cheese is delivered, and in which it is emulsified and then forced through a perforated plate and thence through a spout from which it can be run into boxes or other packages.

The pasteurization, whether with or without the preliminary or subsequent emulsification, or both, is continuous in character, the mixed or unmixed cheese, which has been ground in a suitable device and afterwards agitated in a suitable mixer, such as a dough mixer, being introduced into the hopper of the machine for forcing or propelling the mass into and through the pasteurizer. The propelling or forcing device may be a machine of the Enterprise type, although other machines may be used for the purpose. In the forcing or propelling device, which is unheated, the material is kept cool, or at any rate, in a lukewarm condition, since by doing so we can control to better advantage the application of heat in the pasteurizer.

The temperature within the pasteurizer itself is very carefully controlled, the pasteurizer being advantageously heated by hot water which is circulated through the tubes or other heating compartments at a temperature which may be from about 150° F. to 170° F.; and the rate of flow of the cheese is advantageously regulated so that its temperature at the outlet of the pasteurizer is 145° F. By maintaining these temperatures and a continuous flow of cheese it will readily be seen that pasteurizing conditions can be maintained without giving to the cheese the cooked flavor due to local overheating characteristic of other processes, in which the cheese is heated and agitated in a steam or hot water jacketed vessel.

The invention will be further described in connection with the accompanying drawings which are somewhat conventional and diagrammatic, and which show suitable forms of apparatus for carrying out the process.

In the accompanying drawings Fig. 1 shows a combined propelling (or propelling and emulsifying) and pasteurizing apparatus; Fig. 2 shows a horizontal sectional view of the pasteurizer; Fig. 3 illustrates, by conventional showing, the preliminary treatment and preparation of the cheese; and Fig. 4 shows a modified form of pasteurizer arranged with an emulsifier for emulsifying the pasteurized material.

The pasteurizing apparatus illustrated is more particularly described and claimed in our companion application, Serial No. 650,973.

In the apparatus illustrated, the propelling device is shown as a machine similar to an Enterprise hasher having a hopper 1 and helical screw 2 driven by suitable means such as a pulley 5. When used without preliminary emulsification of the cheese, the propelling device may be in free and open communication with the pasteurizer so that the cheese will be forced into the pasteurizer with only the resistance due to the pasteurizer itself and the friction of the cheese flowing through it.

When the propelling device is also used as an emulsifier, the back pressure upon the cheese may be increased by a perforated plate between the propelling device and the pasteurizer, as more fully explained in our said companion application.

The pasteurizer illustrated comprises a pasteurizing chamber 8 provided with a set of tubes 10 placed rather closely together and through which hot water or other heating medium is circulated and around which and between which the cheese is forced by the propelling mechanism. The pasteurizer has an inlet chamber 7 and a discharge chamber 9 with an outlet 4.

Below the pasteurizing chamber 8 is a lower chamber 11 having an inlet 12 for the hot water or other heating medium and a drain cock 13 at the bottom. The heating medium enters the lower chamber and flows up through the tubes in to the upper chamber 14 and thence out through the outlet 15.

It will be evident that the pasteurizer may be constructed with any desired number of heating tubes, and that the number of tubes and their arrangement can be varied. They may be spaced as closely together as possible so long as they do not interfere with the proper flow of the cheese through the apparatus. The amount of heating surface can thus be made relatively large.

As a result the heating medium can be maintained at a moderate temperature and the entire mass of cheese nevertheless heated to the desired temperature within a very short interval of time, and without danger of local overheating.

As a means of controlling the temperature, ordinary thermometers and also recording thermometers are maintained in the current of the circulating water and also at the outlet of the pasteurizer, as indicated at 16 in the drawing.

The regulation of the pasteurizing or sterilizing operation can be effected by controlling the temperature and flow of the heating medium or by regulating the rate of flow of the cheese or by proper design of the pasteurizer; and it will be evident that one or more of these three variables can be controlled to give the desired result.

In our usual practice we maintain a temperature of 145° F. in the cheese which has gone through the pasteurizer, although, making use of the same process and apparatus, we can maintain any other temperature which is desired. For example, if it is desired to sterilize the product more completely, we can apply temperatures within the tubes up to 212° F. with hot water or open steam, or temperatures above that point with steam under pressure.

As an example of the application of the present process we will refer to the treatment of a mixture made up of the following ingredients:

| | Pounds. |
|---|---|
| Full cream cheese | 70 |
| Aged full cream cheese | 20 |
| Pimento peppers | 10 |

An emulsifying agent such as a small amount of soda or the equivalent may be added if desired, the addition of such an emulsifying agent materially promoting and facilitating the emulsification.

This formula is susceptible of wide variation in producing a final product of uniform flavor. If the full cream cheese is quite fresh, more aged full cream cheese may be added. On the other hand, if the full cream cheese is older, less aged cheese may be used. In addition to pimento peppers, other flavoring substances may be added, such as salt, vinegar, pepper, sage, sugar, etc. Also for conferring special cheese flavors, other types of cheese may be used in the formula, such as Swiss, Roquefort, Limburger and others.

The different types of cheese are cut up into coarse blocks as indicated conventionally at A in Fig. 3. The cheese is then ground in any suitable grinder or hasher such as indicated conventionally at B in Fig. 3. The ground cheese is received in trucks or receptacles C and the amounts weighed as indicated are introduced into the dough mixer D and thoroughly mixed after which the mixture is fed by a feeding device into the hopper of the propelling, or combined propelling and emulsifying device, from which it is forced into and through the pasteurizer. The time in the pasteurizer, depending on its size and construction, varies from about 15 seconds to about 1 minute, but by preference we employ a 40-second period for passage through the pasteurizer.

This pasteurizing treatment may be considered a flash pasteurization. In so far as we are aware, cheese has not heretofore been considered capable of being pasteurized by such a process of flash pasteurization. In this process, the cheese is rapidly heated by contact for only a very short time with the heating surfaces, and after this rapid and uniform heating to the pasteurizing temperature, the cheese is then continuously passed out of the pasteurizing apparatus and can be subjected to a further emulsification before being packaged. The subsequent emulsification is carried out without further heating of the cheese. The present process is therefore of an entirely different character from processes in which cheese is heated in batches over a long period of time and with continued agitation during the entire period of heating.

In the apparatus illustrated in Fig. 4 the pasteurizer and propelling device are similar to those of Fig. 1, but in addition, an emulsifier is arranged to receive the pasteurized cheese and to subject it to an emulsifying operation. While the cheese, even without preliminary or subsequent emulsification, may be satisfactorily pasteurized, yet in order to control the texture of the product more completely and to afford complete control of the rate of flow for subsequent boxing or packaging, the cheese may advantageously be passed from the pasteurizer through the emulsifier, as illustrated in Fig. 4, and this is particularly advantageous where the cheese is not emulsified before it is passed through the pasteurizer, or when a higher degree of emulsification is desired. The emulsifier of Fig. 4 has a hopper 1ª and helical screw 2ª similar to those of the propelling device above described; and it also has a perforated plate 20 for securing sufficient back pressure to insure emulsification. The emulsified cheese is forced through this perforated plate and thence to the spout 21 from which the emulsified and pasteurized or sterilized cheese may be received in the box 22. The provision of such an emulsifier not only gives an emulsified product of uniform texture, but gives control of inequalities of flow from the pasteurizer and maintains a uniform rate for boxing or packaging purposes.

It will thus be seen that the present invention provides an improved process by which cheese can be pasteurized or sterilized continuously and with perfect temperature control, being thus distinguished from processes which are intermittent in character and in which separate batches of cheese are separately treated. It will further be seen that the invention provides an improved process in which the cheese can be both pasteurized and emulsified, and an emulsified and pasteurized product produced in a continuous manner.

It will further be seen that the invention provides a new and improved cheese product which is both emulsified and pasteurized (or sterilized) and which presents the important advantage that it can be melted for cooking purposes as in the making of Welsh rarebit, and, when so melted, butter-fat separation does not occur, or not to a material degree. In this important respect the new cheese product is distinguished from loaf cheese heretofore manufactured. The new cheese product is not, however, claimed herein, as it is claimed in our companion application, Serial Number 650974, filed of even date herewith.

In referring to the cheese as an emulsified cheese, we mean that the cheese when melted will assume the state of an emulsion without appreciable butter fat separation.

We claim:

1. The process of pasteurizing cheese which comprises forcing the cheese in a continuous manner into and through a pasteurizing apparatus and heating the cheese rapidly and uniformly therein to the pasteurizing temperature and subjecting the cheese by passing therethrough to contact with heated surfaces for only a short interval of time and thereby heating the cheese to a pasteurizing temperature, and discharging the resulting cheese continuously from the apparatus.

2. The process of pasteurizing cheese which comprises causing the cheese to pass in a continuous manner through a combined mixing and forcing device and thence into and through a pasteurizing apparatus and in contact with heated surfaces for only a short period of time and thereby rapidly heating the cheese to a pasteurizing temperature, and discharging the resulting cheese continuously from the apparatus.

3. The process of pasteurizing cheese which comprises forcing the cheese into and through a chamber containing tubes through which the pasteurizing medium is circulated, the cheese being in contact therewith for only a short period of time.

4. The process of pasteurizing cheese and the like which comprises forcing the same continuously in intimate contact with a series of tubes which are heated to a predetermined temperature by means of a circulating heating medium, the cheese being in contact therewith for only a short period of time.

5. The process of pasteurizing cheese and the like which comprises forcing the same continuously in intimate contact with a series of tubes which are heated to a temperature of about 140 to 150° F. by means of circulating water, the cheese being in contact therewith for only a short period of time.

6. The process of making pasteurized loaf cheese which comprises grinding the ordinary types of cheese, mixing them in the desired proportions either with or without condimental substances, and passing the ground and mixed product in a continuous manner through a pasteurizing apparatus and rapidly heating the same therein continuously to a pasteurizing temperature, the cheese being in the pasteurizing apparatus for only a short period of time.

7. The process of making pasteurized loaf cheese which comprises grinding the ordinary types of cheese, mixing them in the desired proportions with or without the addition of condimental substances and passing the resulting ground and mixed product in a continuous manner through a propelling device and thence through a pasteurizing chamber and into contact with heated surfaces for only a short period of time, and thereby rapidly heating the cheese in a continuous manner to the pasteurizing temperature.

8. The process of pasteurizing cheese and the like which comprises continuously passing the cheese through a pasteurizing apparatus and into contact with heated surfaces for only a short period of time and thereby rapidly heating the cheese to a pasteurizing or sterilizing temperature, and then subjecting the cheese to an emulsifying operation.

9. The process of pasteurizing cheese which comprises forcing the cheese in a continuous manner successively through a pasteurizing apparatus and an emulsifying apparatus, the cheese being rapidly heated in the pasteurizing apparatus for only a short period of time.

10. The process of pasteurizing cheese which comprises subjecting the cheese to flash pasteurization by causing the cheese to flow continuously over heated surfaces with which it is brought into contact for only a short period of time and by which it is rapidly heated to the pasteurizing temperature, and continuously removing the cheese immediately after it has been heated to such temperature.

11. The process of making pasteurized loaf cheese which comprises grinding the ordinary types of cheese, mixing them in the desired proportions with or without the addition of condimental substances, passing the resulting mixture continuously through a pasteurizing apparatus in which the cheese is rapidly heated for only a short period of time, and then subjecting the resulting product to an emulsifying operation.

12. The process of making pasteurized loaf cheese which comprises grinding the ordinary types of cheese, mixing them in the desired proportions either with or without condimental substances, passing the ground and mixed product through a pasteurizing apparatus in which it is rapidly heated by being brought into intimate contact for only a short period of time with a series of tubes maintained at a constant temperature, and then passing the resulting cheese through an emulsifying apparatus.

13. The process of pasteurizing cheese which comprises forcing the cheese rapidly and continuously through a pasteurizing chamber and into contact with a series of heating tubes through which hot water is circulated at a temperature of about 150° F. to 170° F., the flow of the cheese being regulated so that its temperature is raised to about 145° F., and the cheese being subjected to contact with such heating tubes for only a short period of time.

14. The process of preparing cheese which comprises subjecting the cheese in a continuous manner successively to pasteurizing and emulsifying operations, the emulsifying operation being effected without heating of the cheese.

In testimony whereof we affix our signatures.

CLINTON H. PARSONS.
WILLIAM D. RICHARDSON.